Figure 1:
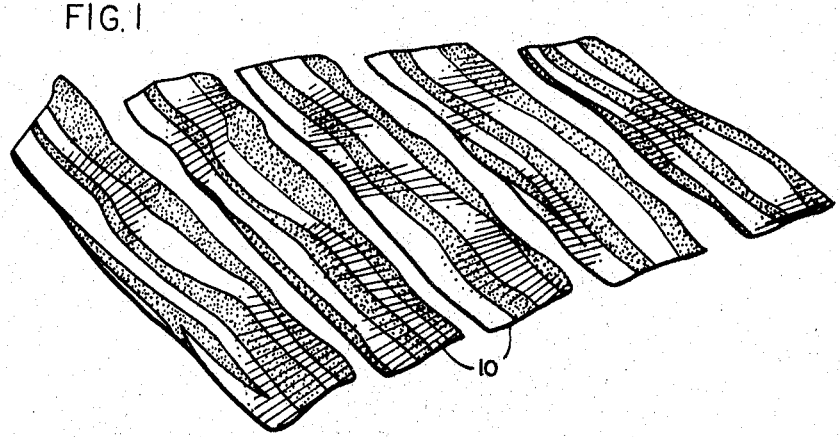

May 23, 1967   M. R. JEPPSON   3,321,314

PROCESS FOR COOKING BACON WITH MICROWAVE ENERGY

Filed Sept. 20, 1965

3 Sheets-Sheet 1

INVENTOR:
MORRIS R. JEPPSON
BY
*Carl C. Batz*
ATT'Y

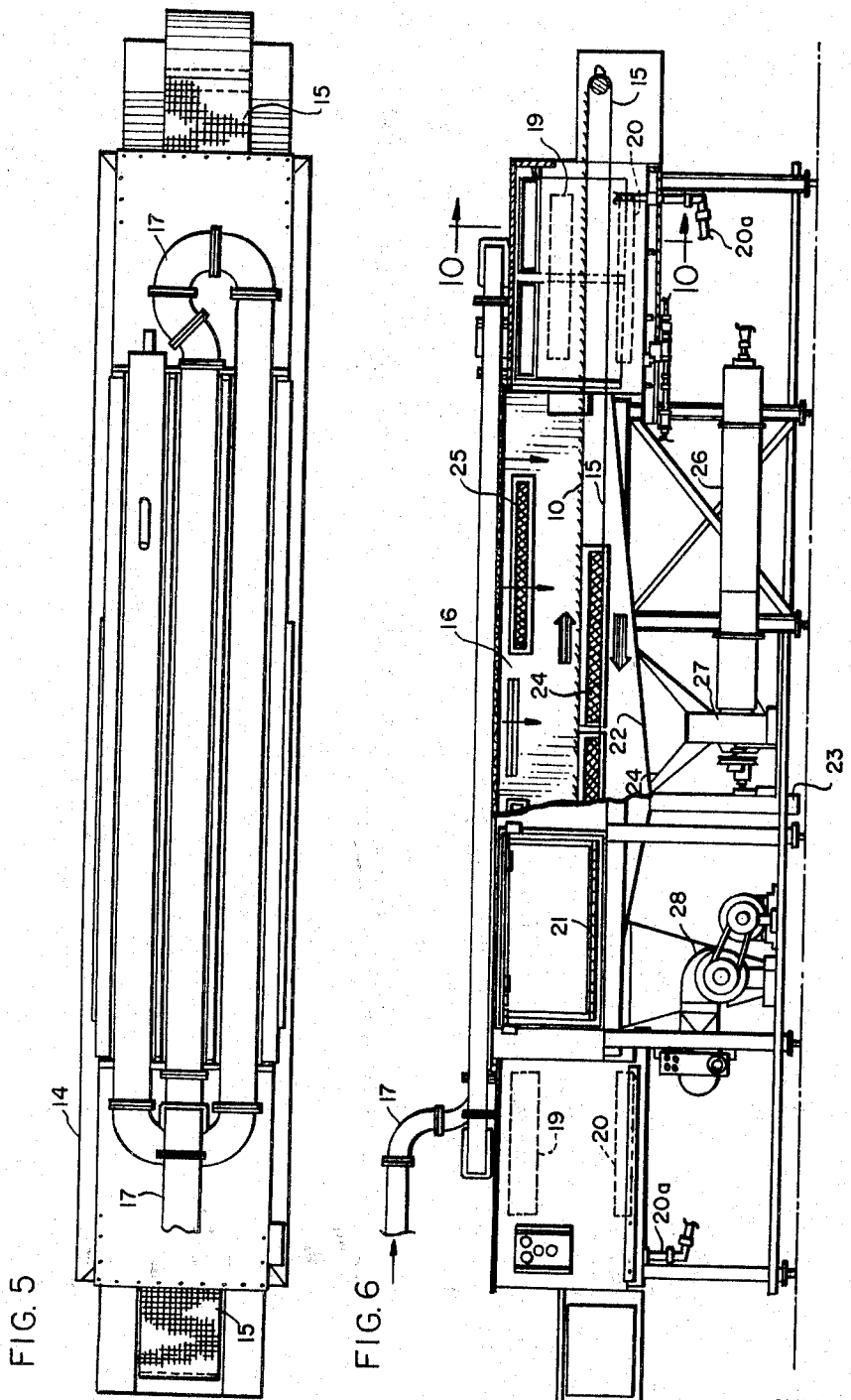

May 23, 1967 M. R. JEPPSON 3,321,314
PROCESS FOR COOKING BACON WITH MICROWAVE ENERGY
Filed Sept. 20, 1965 3 Sheets-Sheet 3
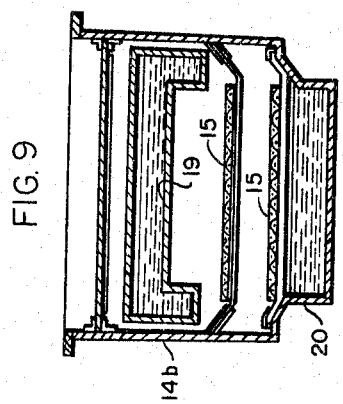
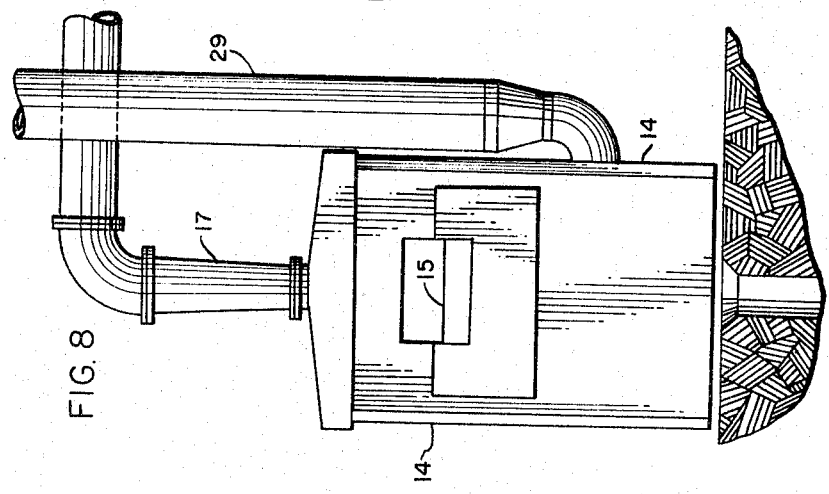
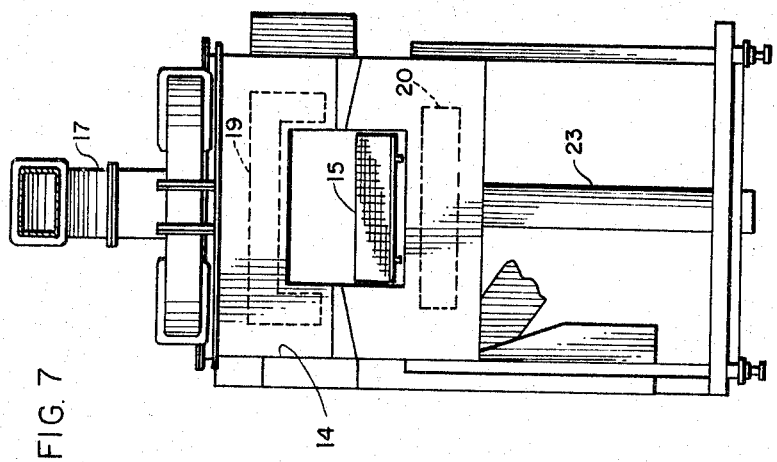
INVENTOR:
MORRIS R. JEPPSON
BY
Carl C. Batz
ATT'Y United States Patent Office 3,321,314
Patented May 23, 1967

3,321,314
PROCESS FOR COOKING BACON WITH
MICROWAVE ENERGY
Morris R. Jeppson, Danville, Calif., assignor to Cryodry
Corporation, San Ramon, Calif., a corporation of California
Filed Sept. 20, 1965, Ser. No. 488,353
2 Claims. (Cl. 99—107)

This application constitutes a continuation-in-part of my copending application, Ser. No. 342,179, filed Feb. 3, 1964.

This invention relates to cooked sliced bacon for packaging, and more particularly to a process for cooking bacon slices by the use of microwave energy while utilizing a controlled process atmosphere in conjunction with microwaves.

For many years there has been a demand for cooked bacon slices because such processing enables the user to avoid the fat-rendering cooking operations, and it is desired that such product be packaged for sale as "precooked" bacon. Previous attempts to preserve sliced bacon by such means as frying, hot air alone, infra-red heating, etc., have resulted in excessive curling, burned areas, and a generally unattractive product. Such methods of cooking, when carried through sufficiently to cook the lean (muscle) portions of the bacon, tend to make the fat portions too crisp or brittle, and when the product is packaged, there is fragmentation or partial fragmentation of the individual bacon slice.

I have discovered that by employing microwave heating in a gas atmosphere, slices of bacon may be cooked while retaining excellent texture, appearance and taste, the slices being effectively packaged in cartons, package boards, and the like. There is no overcooking of the fat because the fat has a lower dielectric loss factor and less energy is absorbed. The lean meat preferentially absorbs more energy and therefore is completely cooked, while the fat portion which receives less energy is not overcooked and does not become too brittle for packaging. The heating by microwaves is effectively controlled to bring about thorough cooking of the lean portion without making the fat portion brittle by employing a controlled gaseous atmosphere which removes moisture and vapors evolved during the cooking operation. By passing the slices through a chamber containing microwave energy while sweeping away evolved vapors, it is possible to cook the lean portions of a bacon slice without overcooking the fat portion, with the result that the product may be packaged and shipped without material fragmentation.

A primary object, therefore, of the invention is to provide a process for the preparation of cooked bacon slices suitable for packaging and shipment. A further object is to prepare cooked bacon slices by passing them through a cooking zone containing microwave energy while maintaining a controlled gaseous atmosphere or current within the zone. A still further object is to prepare cooked bacon slices in a manner which prevents their fragmentation during packaging and shipment. Other specific objects and advantages will appear as the specification proceeds.

The process may be carried out in any suitable apparatus and preferably in apparatus of the type shown in the accompanying drawings, in which—

Figure 2:
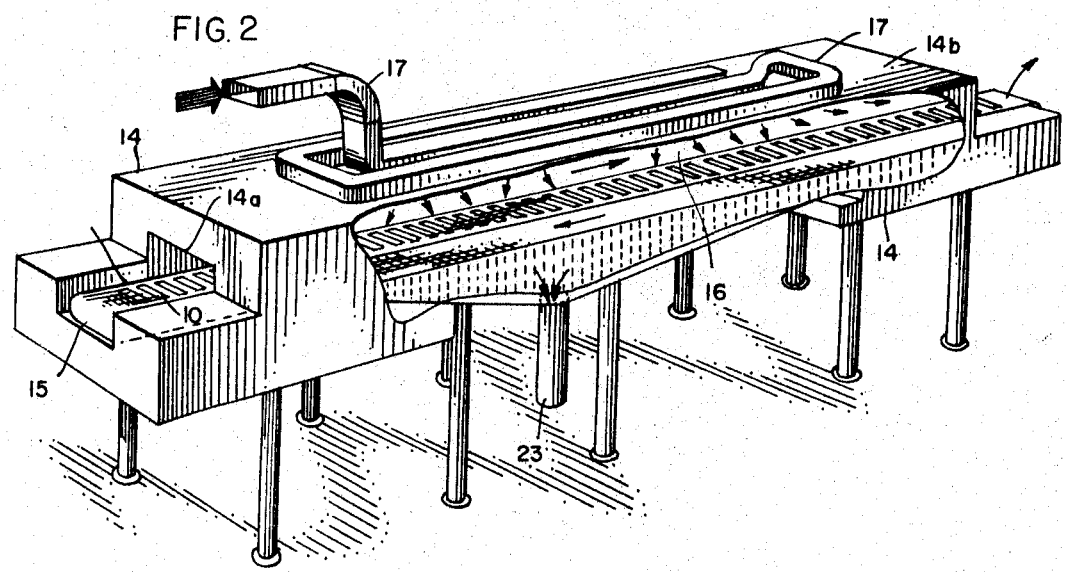
Figure 3:
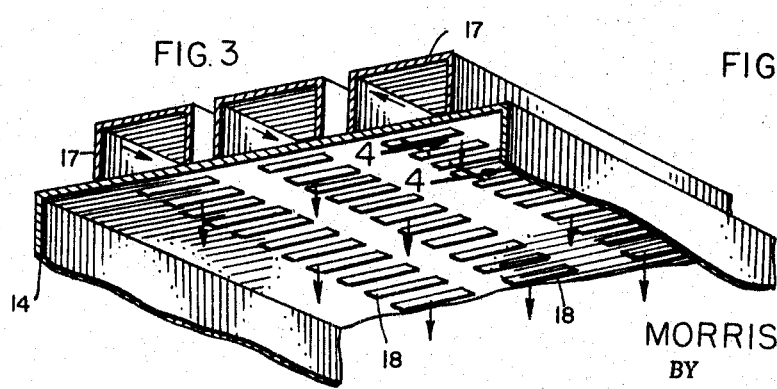
Figure 4:
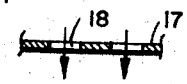

FIGURE 1 is a perspective view of single bacon slices in spaced relation for exposure to microwave energy; FIG. 2, a broken perspective view of apparatus for cooking bacon slices; FIG. 3, an enlarged broken perspective view showing the slots through which microwave energy is directed through bacon slices; FIG. 4, a detail sectional view, the section being taken as indicated at line 4—4 of FIG. 3; FIG. 5, a top plan view of the microwave-applying apparatus; FIG. 6, a broken side view in elevation of the structure shown in FIG. 5; FIG. 7, a front view in elevation of the apparatus shown in FIG. 5; FIG. 8, an end view on a reduced scale of the microwave-applying apparatus and showing the exhaust duct communicating with the apparatus; and FIG. 9, a detailed sectional view, the section being taken as indicated at line 9—9 of FIG. 6.

In the illustration, 10 designates bacon slices arranged in spaced-apart relation. The cooking with microwave energy may be accomplished in any suitable apparatus and in any suitable manner. The range of microwave frequency is 400–20,000 megacycles/second, and the energy levels may vary from 8–25 kilowatts and higher, depending on the desired cooking time, the character of the slices being cooked, etc.

Apparatus suitable for cooking the bacon through the use of microwave energy and a gaseous atmosphere is shown in FIGS. 2–9, inclusive. In such apparatus, there is provided a casing 14 formed of a highly conductive material, such as aluminum or copper, and in the casing is mounted a continuous mesh conveyor 15. The conveyor is preferably formed of Teflon-coated fiberglass, and the mesh is 4 x 5 mesh; that is, four openings per inch in one direction and five openings per inch in the opopsite direction. The conveyor or belt 15 may be formed of any electrically non-conductive material, such as various well known plastics or treated fabrics. The driven conveyor 15 carries the bacon slices 10 through the cooking chamber 16 in the central portion of the casing 14.

Microwave energy is delivered through a waveguide duct 17 of metal and the guide 17 traverses the top of the metal casing 14, the guide portions over the chamber 16 being provided with transverse slots 18 in their bottoms so that the microwave energy is delivered downwardly through the bacon on conveyor 15, as shown best in FIG. 7.

At the ends of the casing in entrance tunnel 14a and exit tunnel 14b, suitable bodies of water or other lossy material are held within containers 19 and 20 so as to absorb the microwave energy reaching the ends of the casing. Such containers for the lossy material are shown best in FIG. 9. A liquid is circulated to and from the containers through pipes 20a. The upper container 19 has at least its bottom portion formed of a dielectric material, such as plastic, glass, ceramic, or the like, which is transparent to microwave energy. Container 20 may be an open container filled with water or other lossy material. If desired, the casing 14 may be provided along one side of the cooking chamber 16 with a hinged conductive metal door 21 providing access to the cooking chamber.

The cooking chamber is provided with a downwardly-inclined drain or bottom portion 22 communicating at its lower point with a drainage pipe 23 for collecting the fat generated during the cooking of the bacon slices. In order to carry away vapors which are also generated during the cooking operation, air or other suitable gas is passed into the chamber through the inlet ducts 24, and the air may be exhausted through outlet ducts 25. The air may range in temperature from ambient to around 230° F. or higher, but I prefer to employ an air temperature of about 80–190° F. Air temperatures higher than 230° F. may be useful in imparting a brown or reddish color to the product while also obtaining an increased production rate per kilowatt hour. In the illustrative apparatus shown, air is heated in the gas combustion heater 26 and forced by fan 27 through the inlets in the chamber 16.

Exhaust air is removed from the chamber by the motor-driven fan 28 through exhaust duct 29.

In the operation of the apparatus, the single bacon slices 10 are arranged in spaced relation on the conveyor 15 and travel first through the entrance tunnel 14a and then through the cooking chamber 16, where they are subject to the microwave energy. The metal walls of the casing prevent the escape of microwave energy. At the enrance and exit tunnels 14a and 14b adjoining the cooking chamber, the bodies of liquid lossy material in containers 19 and 20 prevent the escape of such energy from the apparatus. The speed of the conveyor and the microwave energy levels are coordinated to provide for the cooking of the bacon. The rendered fat is carried away by the inclined bottom 22 to the drain pipe 23. The current of air supplied by the fans carries away evolved vapors, and such air may be heated to temperatures varying from ambient to about 230° F. or higher, as hereinbefore stated. Generally, an air temperature from 80 to 190° F. is preferred.

The microwave energy may be varied widely in the range of 400–20,000 megacycles/second, but I prefer to employ a microwave oven operating at a frequency of about 900 megacycles and having a capacity or energy level 25 kilowatts or higher.

By way of example, when employing a microwave oven operating at a frequency of 915 megacycles, I find that the cooking times range from about 1.5 to 2.0 minutes and the microwave energy level is from 9 to 20 kilowatts for an approximately 60 percent cooking shrink. This is an approximate range of 8 to 10 pounds per kilowatt hour.

As the pre-cooked bacon slices leave the cooking chamber, I prefer to direct air jets (not shown) of moderate velocity for blowing off excess rendered fat, and the slices may then be chilled by passing them through a blast chill tunnel which lowers the temperature preferably to about 45–50° F. After chilling, the pre-cooked bacon slices may be placed on a board or other support and a transparent wrapper secured about the package; or, if preferred, the bacon may be simply enclosed within a box or carton.

The microwave energy injected into chamber 16 is repeatedly reflected between the conducting walls of the housing 14, and is substantially absorbed in the meat. A minor portion of the energy may propagate toward the exit and entrance channels where it is attenuated by the lossy material in containers 19 and 20. The energy passes repeatedly through the bacon product and a portion of the energy is absorbed with each passage and appears as heat within the bacon. The unabsorbed energy reaching the entrance and exit portions of the casing must pass repeatedly through the lossy liquid in containers 19 and 20 so that it is substantially attenuated before reaching the open ends of the casing.

In the heating of the bacon by microwave energy, there is a rapid concentration of moisture near the surface. Hot vapors generated in the interior of the product by microwave heating drive free water toward the surface, promoting localized cooling. By passing warm or heated air streams over the exposed bacon slice surfaces, a more even heating of the bacon slice throughout is achieved.

The gas employed may be air, nitrogen, or any other suitable inert gas, and the gas is employed at a moderate velocity which is effective in sweeping away the evolved moisture or other vapors, thus increasing the effectiveness of the microwave energy. Further, by moving the bacon slices progressively through the treating chamber, a more effective control of the cooking is brought about, since the vapors are evolved relatively early in the stage of cooking and the microwaves passing through the bacon in later stages of travel do not have to pass through columns of vapor.

Specific examples illustrative of the invention may be set out as follows:

Example I

Bacon slices in spaced-apart relation were exposed to microwaves having an approximate energy level of 23 kilowatts for one and one-half minutes of dwell time. Simultaneously, air heated to an approximate temperature of 190° F. was moved continuously through the oven across the exposed bacon slices. This resulted in a cook shrink of about 58 percent. Air jets were directed onto the cooked bacon to remove excess fat, and the bacon was then passed into a chill tunnel and the temperature lowered to about 40° F. The bacon slices were then placed within a carton and the carton closed for shipment.

Example II

Bacon slices were placed on a conveyor in apparatus of the type shown in FIGS. 2–9 of the drawings. Transit time through the microwave region was 5½ minutes, and the controlled atmosphere flow was at the rate of 400 cubic feet per minute and consisted of air at a temperature of 200° F. and at a relative humidity of 8 percent. About 97% of the final weight reduction, from 250 grams to 183 grams, took place in 4½ minutes. The bacon was then vacuum packed in cans.

Example III

The process was carried out as described in Example II except that at the end of the cooking operation, the air temperature was then increased to 600° F. for a period of one minute while still exposing the bacon to microwaves, thereby accelerating the final drying and producing a desired bright coloration. The bacon was then packaged in glass jars.

Example IV

The process was carried out as described in Example I except that the air temperature was about 150° F. and the product after chilling was packaged in a plastic pouch.

Example V

Bacon slices were exposed in apparatus as shown in FIGS. 2–9 of the drawings to microwaves having a frequency of 915 megacycles and having an energy level of 18 kilowatts for a period of two minutes. Hot air heated to a temperature of 160° F. was moved through the oven cavity and over the surface of the bacon strips. This produced a cook shrink of 64%. The product had a good taste, the muscle portion being thoroughly cooked and the fat portion being crisp but resisting fragmentation. After packaging in a plastic pouch, it was noted that fragmentation did not occur.

While in the foregoing specification I have set out process steps and procedure in considerable detail for the purpose of illustrating embodiments of the invention, it will be understood that such details may be varied widely by those skilled in the art without departing from the spirit of my invention.

I claim:

1. In a process for cooking bacon slices to produce fully-cooked lean portions and crisp fat portions which may be packaged without material fragmentation, the steps of maintaining an elongated, continuous, confined cooking zone, passing openly-exposed bacon slices through the length of said zone on a perforated continuous belt of electrically non-conductive material permeable to microwave energy, passing microwave energy into said zone at a level for cooking said bacon while rendering fat therefrom, evolving vapors and concentrating moisture near the surface of the slices, continuously removing the fat through the perforations of said belt as the fat is rendered from said openly-exposed slices and as the slices move through said elongated zone under exposure to said microwave energy, and passing an air current at a temperature in excess of 80° F. over said slices to remove said surface moisture and evolved vapors.

2. In a process for cooking bacon slices to produce cooked fat and lean portions with the fat portions crisp but packageable without material fragmentation, the steps of maintaining an elongated confined cooking zone, passing openly-exposed bacon slices on a perforated conveyor formed of electrically non-conductive material permeable to microwave energy through the length of said zone, passing microwave energy into said zone at a level for cooking said bacon while rendering fat therefrom, evolving vapors and concentrating moisture near the surface of the slices, continuously removing the fat as it is rendered from said openly-exposed slices as they move through said elongated zone under exposure to said microwave energy, and passing heated air at a temperature of 150–600° F. over said slices to remove said surface moisture and evolved vapors.

References Cited by the Examiner

UNITED STATES PATENTS

| | | | |
|---|---|---|---|
| 1,753,879 | 4/1930 | Carter et al. | 99—107 |
| 3,027,442 | 3/1962 | Verstraten | 219—10.55 |
| 3,056,877 | 10/1962 | Schmidt et al. | 219—10.47 |
| 3,127,494 | 3/1964 | Kellough et al. | 219—10.55 |

A. LOUIS MONACELL, *Primary Examiner.*

L. M. SHAPIRO, *Assistant Examiner.*